United States Patent [19]

Jansen et al.

[11] 3,747,468

[45] July 24, 1973

[54] ANCHOR BOLT

[75] Inventors: Johan Wilhelm Jansen; Hendrik Hoffman, both of Hilversum, Netherlands

[73] Assignee: Huygmetal N.V., Hilversum, Netherlands

[22] Filed: Nov. 10, 1971

[21] Appl. No.: 197,315

[30] Foreign Application Priority Data
Nov. 12, 1970 Netherlands.................... 7016529
Jan. 27, 1971 Netherlands.................... 7101034

[52] U.S. Cl. ............................................... 85/79
[51] Int. Cl. ............................................ F16b 13/06
[58] Field of Search .................. 85/75, 77, 79, 85, 85/86, 78, 76

[56] References Cited
UNITED STATES PATENTS
2,832,253  4/1958  Allimann .................... 85/79
3,250,170  5/1966  Siegel ........................ 85/85
3,277,770  10/1966  McCulloch .................. 85/79

*Primary Examiner*—Edward C. Allen
*Attorney*—Eric H. Waters et al.

[57] ABSTRACT

An anchor bolt assembly of the type wherein expansion members are slidably mounted on an expansion portion of the bolt by means of a brace interconnecting the expansion members and passing over the bolt end. The expansion members have the shape of wings stamped together with the brace legs and its base from one piece of sheet material. The brace base engages the end face of the bolt. The wings collectively encircle the greater part of the circumference of the conical expansion bolt portion. Hook means formed by bent rear corners of rear wing parts extend beyond the bolt circumference in an outward-backward direction.

8 Claims, 8 Drawing Figures

ANCHOR BOLT

BACKGROUND OF THE INVENTION

1. Field of the Invention

The invention relates to anchoring devices and is directed more particularly to an expansion bolt assembly which may be expanded to engage the interior of a bore in a wall e.g., a concrete wall to firmly anchor the bolt in the said bore. More specifically the invention relates to anchor bolts bearing expansion means of a type which allow the assembly to be inserted in a bore having only a slightly larger diameter than that bolt diameter which defines the strength of the bolt.

2. Description of the Prior Art

From the prior art anchor bolts are already known including expansion elements which are mounted on the periphery of a portion of a bolt and lie within the circumference of the bolt before the bolt is anchored. Generally, expansion bolts of this type include slide members mounted on wedge shaped or frusto-conical shaped portions of the bolt body.

While such bolts have performed satisfactorily, they have shortcomings which are overcome by the instant invention.

The prior art discloses an anchor bolt assembly comprising an elongated cylindrical bolt member having a wedge shaped expansion portion of reduced diameter increasing towards the bolt end substantially onto the main bolt expansion diameter members being provided along a part of the length of said expansion portion and substantially within the circumference of the said bolt, the expansion members being interconnected by means of a brace member which is passed over the said bolt end and formed in one piece with the said expansion members from sheet material.

The application of a brace member as mentioned brings the great advantage that it ensures that the expansion members will not be displaced or disarranged when the assembly is driven into a bore e.g., of a concrete wall.

However, it has been found that the solutions provided in this prior art all have another shortcoming in so far as they are difficult to manufacture as the mantle formed by the expansion member had to be widened or split up by means of the bolt expansion portion in two segments during a first phase of expansion, wherein the expansion member is not yet securely wedged between the bore wall and the bolt expansion portion. The expansion member may easily move together with the bolt during this first phase, the wedging function then becoming illusory.

Therefore the problem of providing fully reliable expansion members in one piece and avoiding additional parts was not satisfactorily solved until now. According to the prior art an additional spring was to be placed between the base of the brace member and the end face of the bolt in order to force the expansion members along the bolt expansion portion during the first phase of anchoring.

SUMMARY OF THE INVENTION

It is a main object of the present invention to provide an expansion bolt assembly including a retaining brace member on the bolt end but having greatly increased reliability as to its functioning under all circumstances.

It is another object of the invention to provide such an improved assembly in which the expansion members are retained by the bolt and the wedging or anchoring function is executed in a fully reliable way without the use of any additional element.

It is a further object of the invention to entrust the functions of retaining the brace in the bore during a first phase of outward movement of the bolt and the proper wedging or anchoring function following thereupon to different parts of the expansion elements each part being adequately designed for its own purpose.

It is a still further object of the invention to obtain the above-mentioned and other objects by simple means which do not increase manufacturing cost.

The above and other features of the invention, including various novel details will now more particularly described with reference to the accompanying drawing and pointed out in the claims.

DETAILED DESCRIPTION

Figure 1:
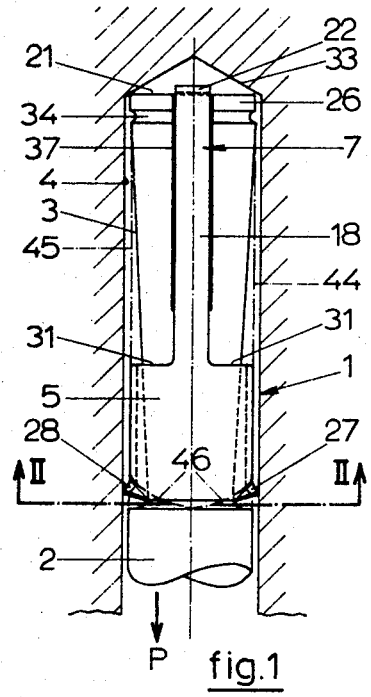
FIG. 1 shows a section along the axis of a bore in a wall wherein an assembly embodying the invention is disposed, the latter being shown in elevational view; only the end part of the bolt and the corresponding part of the bore are shown as the rest of the anchor bolt may be of any usual construction.

In the figures of the drawing, the assembly is indicated by 1, a brace shaped by bending and folding a piece of metal stamped from a metal sheet is indicated as a whole by 7, a conical expansion portion of a bolt 2 by 3, a wall bore wherein the anchor bolt assembly has been disposed by 4. The ends of brace legs 18, 19 each enlarge into respective wing plates 5 and 6 (FIGS. 1-3 and 7-8). These wings are bent substantially in the shape of cylindrical mantle pieces encircling together the greater part of the bolt expansion portion 3.

According to the present invention the function of retaining the expansion members in the bore 4 during the first phase of pulling the bolt in the direction P (FIG. 1) is entrusted to the rear portions of the wing plates 5, 6 ("rear" to be understood as most backward with respect to the forward end of the bolt 2). These rear portions provide hook means which are obtained in the first embodiment (FIGS. 1-3) and third embodiment (FIGS. 7-8) simply by setting the rear corner tips 27-29 of the rear wing portions in an outward-backward direction. On inserting the bolt 1 in the bore 4 these springy wing tips will be bent resiliently slightly downwardly scraping along the bore wall but on pulling the bolt 2 in the direction of arrow P they will bite into the walls and the bolt expansion portion will move under the wings 5, 6 expanding the forward wing portions which will be wedged during this second or anchoring phase between the conical bolt portion 3 and the bore walls 4. This anchoring or wedging function is substantially entrusted to the regions 31, 32 near the forward edges of the forward wing portions. The brace legs 18, 19 take no part in this wedging function as they are countersunk in longitudinal bolt grooves 36, 37.

During insertion of the bolt 2 in the bore 4, the brace base 22 is supported directly upon the end face 21 of the bolt which will find support in the bore exactly where the cylindrical bore passes into the usually more or less conical bottom 33 thereof. Material which might be scraped from the bore wall during the insertion of the bolt will easily be taken up in the ring space around the conical expansion portion 3, before, below and behind the expansion members 5, 6 and for the same purpose a ring groove 34 is provided defining a bolt end part in the shape of a cylindrical disk 26.

Figure 3:
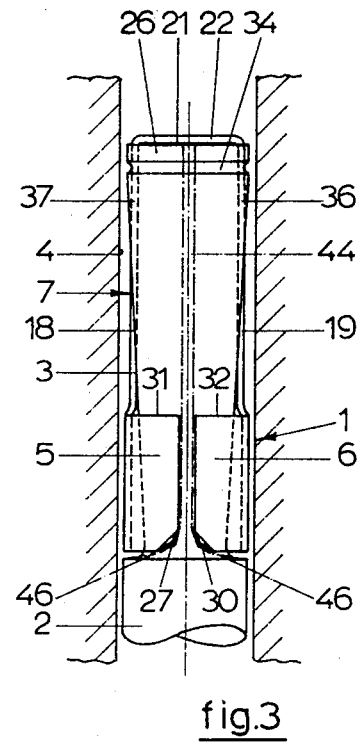
FIG. 3 is a view corresponding to that of FIG. 1 but in a plane of view perpendicular to that of FIG. 1.
Figure 2:
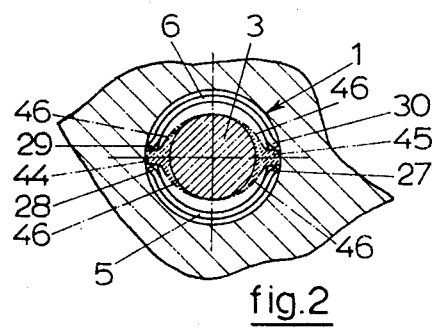
FIG. 2 is a cross-sectional view taken along the line II—II of FIG. 1.
Figure 5:
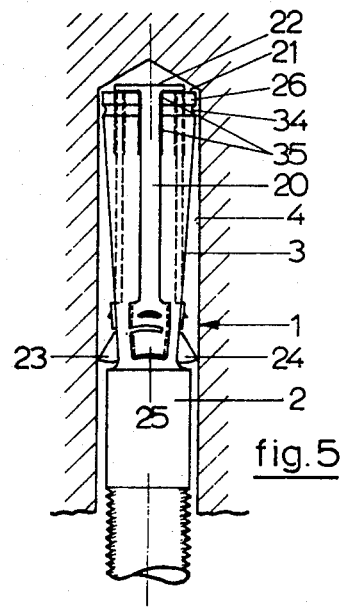
FIG. 5 is an elevational view corresponding to that of FIG. 1, however a brace member has been used which is formed by folding and bending the metal plate piece of FIG. 4.
Figure 4:
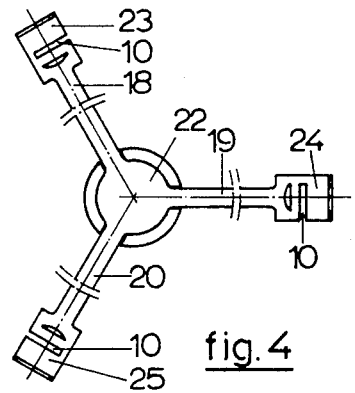
FIG. 4 is an elevational view of another embodiment of a brace member shown in its original shape as it is stamped from a metal plate.

In the embodiment of FIGS. 4 and 5 the brace member has three legs 18, 19, 20 enlarging at their ends into respective wings 23, 24, and 25. After setting these wings each in the shape of a substantially cylindrical mantle piece and folding the legs 18–20 downwardly, perpendicularly to the plane of the drawing near the periphery of a base disc 22, the whole can be placed on the expansion portion 3 as shown in FIG. 5 substantially in the same way as shown in FIGS. 1–3. But now three wings 23–25 together encircle the portion 3 in the manner of a sleeve.

It will have been understood from FIGS. 1–3 that the backward portions of each of wings 5,6 have sufficient springy qualities with respect to the forward wing portions to allow them to be resiliently pressed inwardly to some extent when the corner tips 27–30 scrape along the bore wall. Moreover these outwardly set tips 27–30 in their turn allow resilient movement with respect to the other parts of the rear wing portions.

Now in the embodiment of FIGS. 4 and 5, means are provided to assign such a degree of resiliency to a rear half of each wing that it can by itself provide a hook means to which the above described retaining function during the first phase of anchoring can be entrusted. For this purpose a slit 10 is provided between the forward and rear half of each wing traversing it through the greater part of its breadth. Now the forward wing portions are set substantially parallel to the bolt axis, the rear wing portions are set in an outwardly mounting position that is inclined oppositely to the inclination of the expansion bolt portion 3. As shown clearly in FIG. 5 the rear edges of the rear wing portions will now bite into the bore wall on retraction of the bolt 2 thanks to their improved resiliency with respect to the forward wing portions and their setting in an inclined position.

Figure 8:
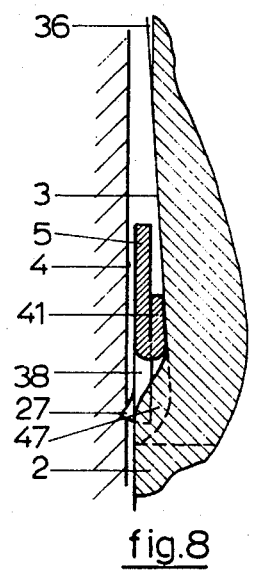
FIG. 8 is a detail cross section on a larger scale along the line VIII—VIII of FIG. 7 the brace being positioned on an expansion portion of an anchor bolt.
Figure 6:
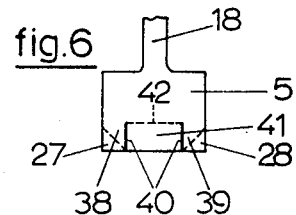
FIG. 6 is a part of another embodiment of a brace shown in the same way as in FIG. 4 but on a larger scale.
Figure 7:
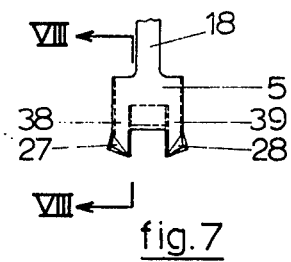
FIG. 7 is a view corresponding to FIG. 6 but after forcing the brace part into its definite form.

In the embodiment shown in FIGS. 6–8, an improved resiliency of rear wing parts 38, 39 (having rear corners 27, 28 set into a backward-outward inclination) with respect to the forward portion or main body of the wing 5 is obtained by means of slits 40 running from the rear wing edge. These slits 40 define a strip 41 attached to the main wing body along a line 42. Now this strip is bent inwardly 180 degrees along the line 42 into engagement with the main wing body as shown in FIGS. 7 and 8. As a result the "wedging" function of the main wing body is improved because it is not only executed by the most forward wing regions but a wedging function is at the same time obtained more backwardly thereof by double walled wing parts engaging the expansion bolt portion 3 thanks to its double thickness at a deeper part of its surface.

The weakest part of a threaded bolt having a uniform diameter throughout its length is usually to be found in the threaded part. However, with an anchor bolt according to the invention, its diameter at the deepest part of the expansion portion 3 may be smaller than the diameter at the thread bottom. The present invention contemplates leaving sufficient material at these deepest parts of the conical portion 3 in order to meet the danger of weakening the bolt at this portion. As shown by chain dotted lines in FIGS. 1–3, rib shaped strips 44, 45 of the original bolt material and of the original bolt diameter can be left in the bolt excavation the bottom of which defines the conical bolt expansion portion 3. These ribs 44, 45 run lengthwise through the excavation and between the wing plates 5,6 (or 23–25, FIG. 5). The rib shaped strips are widened at their foot where they merge into the main bolt body 2 as there is sufficient space below the rear wing portions for rib material.

Further it can be seen from FIG. 8 that short ribs or embossings 47 of the original bolt diameter can extend between the rear wing portions 38, 39 which are situated on both sides of the folded wing strip 41.

The invention makes outwardly extending ears or noses in the forward "wedging" anchoring wing regions unnecessary and practice has shown that these can better be avoided because the concrete material of the bore walls is too strongly attacked locally by such noses.

As to dimensions preferably to be choosen in practical use of the improved anchor bolt assembly in concrete material, the prescribed drill diameter may be the same as the bolt diameter, as normally the drill has some upward tolerance. The difference between the bore diameter and the diameter of an anchor bolt to be disposed therein will be below 1 mm. The sheet material from which the brace is made will have a thickness of 0.8 mm for a 6 mm anchor bolt diameter, 2.25 mm for a 30 mm anchor bolt and in proportion thereto other thicknesses for bolt diameters therebetween. The slope of the conical bolt expansion portion 3 is preferably choosen at 5°.

The outwardly bent wing tips 27–30 will also prevent turning of the bolt in the bore 4 before the anchoring regions 31, 32 have come into action. In fact the sharp points of the wing tips scrape longitudinal grooves into the bore wall when the bolt is inserted therein and they are held in these grooves when a rotational force is exerted on the bolt during screwing a nut on its outer, threaded end extending from the bore.

It is further to be noted that where the expansion portion 3 is indicated as to be substantially "conical" or "frusto-conical" this expression includes shapes wherein the surface defines a concave curve as known, for example, from the afore-mentioned patent to La Roy B. Passer.

What I claim to be new and desire to protect by Letters Patent is:

1. An anchor bolt assembly comprising a bolt including an elongated cylindrical bolt portion and a wedge-shaped expansion portion of reduced diameter extending in prolongation of said bolt portion towards the front of the bolt, said wedge-shaped expansion portion having a diameter which increases towards the front of the bolt, expansion members mounted along a part of the length of said expansion portion and substantially within the circumference of said bolt portion, a brace member engaged over the front end of said bolt and formed integrally with said expansion members thereby to interconnect the same, said brace member and expansion members being constructed from sheet material, said brace member including rearwardly extending brace legs, said expansion members including wing plates connected to the brace legs in rearward extension thereof, said wing plates substantially encircling said bolt expansion portion to constitute anchoring means to clamp the bolt in a bore in a structure by outward expansion of said wing plates upon rearward movement of the expansion portion, said wing plates each having a rear edge with outwardly bent corners extending outwardly beyond the circumference of the bolt at an inclination opposite to the inclination of the conical expansion portion of the bolt to constitute a hook means to engage in said bore and resist rotation of the bolt assembly in the bore and withdrawal of the bolt assembly from the bore.

2. An anchor bolt assembly as claimed in claim 1, wherein said brace legs merge directly with said wing plates, the latter being circumferentially enlarged and having forward edges cooperatively extending along the full circumference of the bolt portion.

3. An anchor bolt as claimed in claim 1 wherein said wing plates are provided with slits extending inwardly from a rear edge of a respective wing plate to define a strip between remaining rear sections of said wing plate, said strip being connected with the remainder of said wing plate along a line about which said strip is folded 180° into engagement with and parallel to the remainder of said wing plate.

4. An anchor bolt as claimed in claim 3 wherein said bolt includes short ribs extending into the space which is left free by said folded wing strips.

5. An anchor bolt as claimed in claim 1 further comprising rib shaped strips integral with said bolt portion and of the same diameter thereas and extending longitudinally along the wedge-shaped expansion portion between said wing plates.

6. An anchor bolt as claimed in claim 5 wherein said rib shaped strips have rear enlarged foot portions where they merge into said bolt portion.

7. An anchor bolt assembly comprising a bolt including an elongated cylindrical bolt portion and a wedge-shaped expansion portion of reduced diameter extending in prolongation of said bolt portion towards the front of the bolt, said wedge-shaped expansion portion having a diameter which increases towards the front of the bolt, expansion members mounted along a part of the length of said expansion portion and substantially within the circumference of said bolt portion, a brace member engaged over the front end of said bolt and formed integrally with said expansion members thereby to interconnect the same, said brace member and expansion members being constructed from sheet material, said brace member including rearwardly extending brace legs, said expansion members including wing plates connected to the brace legs in rearward extension thereof, said wing plates including forward portions substantially encircling said bolt expansion portion to constitute anchoring means to clamp the bolt in a bore in a structure by outward expansion of said wing plates upon rearward movement of the expansion portion, said wing plates including rear portions extending outwardly beyond the circumference of the bolt in spaced relation from said bolt expansion portion at an inclination opposite to the inclination of the conical expansion portion of the bolt to constitute a hook means to engage in said bore and resist rotation of the bolt assembly in the bore and withdrawal of the bolt assembly from the bore, each wing plate being provided with a slit extending between said forward and rear portions, said slit partially traversing the associated wing plate through the greater part of its breadth to provide resilience for said rear portion.

8. An anchor bolt assembly as claimed in claim 7, wherein said brace legs merge directly with said wing plates, the latter being circumferentially enlarged and having forward edges cooperatively extending along the full circumference of the bolt portion.

* * * * *